No. 898,041.
PATENTED SEPT. 8, 1908.
D. D. DENNIS.
ANIMAL TRAP.
APPLICATION FILED JAN. 20, 1908.
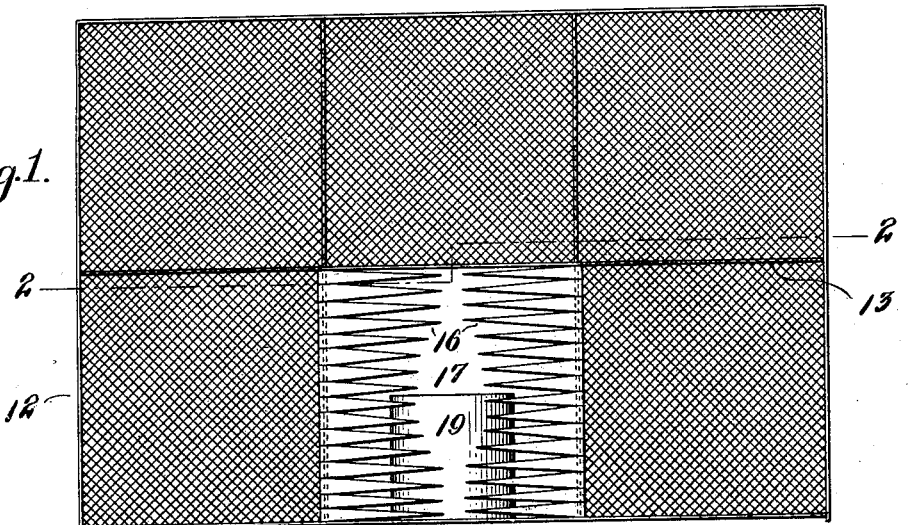
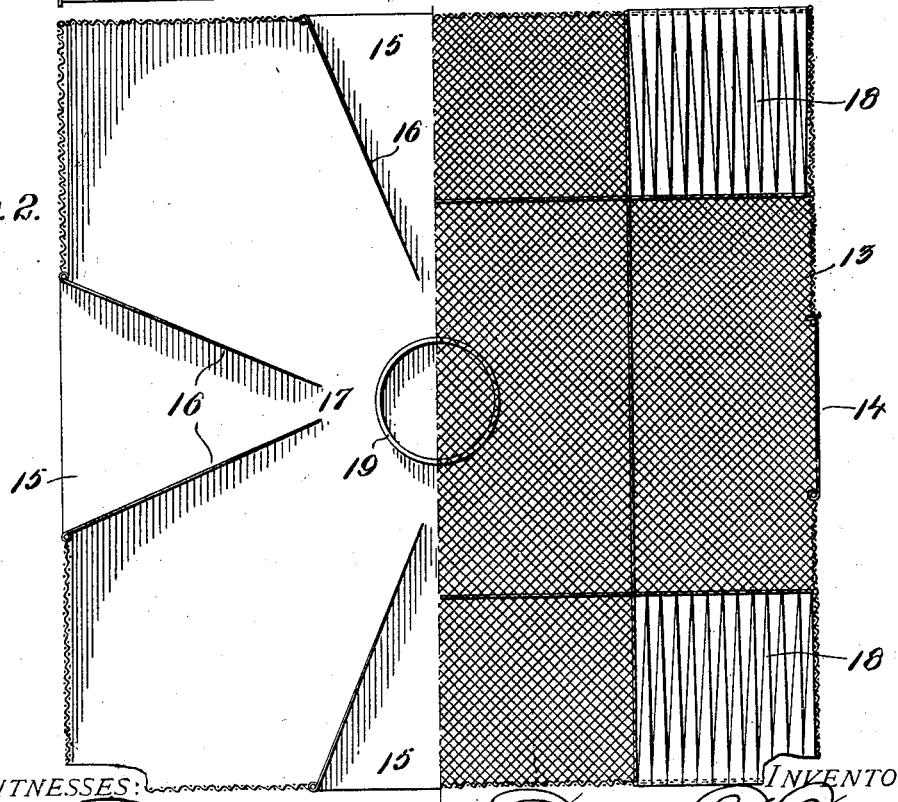

UNITED STATES PATENT OFFICE.

DECATUR D. DENNIS, OF SAN ANTONIO, TEXAS.

ANIMAL-TRAP.

No. 898,041.  Specification of Letters Patent.  Patented Sept. 8, 1908.

Application filed January 20, 1908.  Serial No. 411,718.

*To all whom it may concern:*

Be it known that I, DECATUR D. DENNIS, a citizen of the United States, residing at San Antonio, in the county of Bexar and State of Texas, have invented or discovered certain new and useful Improvements in Animal-Traps, of which the following is a specification, reference being had therein to the accompanying drawings.

This invention relates to animal traps, and has for its object to provide a trap which will be simple in construction, which will permit the ready entry of the animal from substantially any direction, which will securely hold the animal after its entry, and which will always be set and ready to receive another animal irrespective of how many may have already been caught.

To these ends my invention comprises certain constructions and combinations of parts all as hereinafter described and particularly pointed out in the claims.

In the accompanying drawings, which illustrate one construction in which my invention may be embodied—Figure 1 is a side elevation and Fig. 2 is a horizontal section, taken substantially on the line 2—2, Fig. 1.

The trap comprises a preferably substantially square cage or other receptacle 12 divided into upper and lower compartments by a horizontal partition 13, and provided with a door 14, normally closed, through which access may be had to the upper compartment for the removal of such animals as may have been caught therein.

The lower compartment is provided with a plurality of entrance openings 15, preferably four in number, at different or opposite sides of the trap, each guarded by a plurality of inwardly extended prongs or pointed fingers 16, constructed of sheet material, preferably metal, as clearly shown in Fig. 1, and arranged in two vertical series at either side of each of the entrance openings 15. The prongs or fingers 16 are preferably fixed in position but are made somewhat elastic in order to facilitate entrance to the trap, and are of a suitable length and arrangement to provide an opening 17 substantially oval in elevation, as shown in Fig. 1.

The partition 13 is provided with a plurality of openings, preferably arranged one at each corner of the trap, each of which is closed by an upwardly hinged trap door 18, preferably composed of a plurality of pointed fingers, somewhat similar to the fingers 16, as shown in Fig. 2.

At 19 I have shown a cup or other receptacle for containing a suitable bait, although the exact means employed for holding the bait may depend upon the character of the bait used. This bait is placed at substantially the center of the lower compartment of the trap.

As will now be seen an animal approaching the trap from any direction will perceive the bait and will find a ready and direct access thereto through the adjacent entrance opening 15, the fingers 16 yielding sufficiently to permit the animal to make its way into the trap but effectually preventing egress therefrom. The animal, upon finding itself entrapped in the lower compartment will search for an exit therefrom and will eventually force its way through one of the trap doors 18, said trap door opening readily to permit the animal to pass upwardly, but closing immediately behind it. The animal is now securely imprisoned in the upper compartment while the lower compartment is again ready for the reception of another.

While I, in order that my invention may be readily understood, have shown and described the same as embodied in a particular construction, I wish it to be distinctly understood that I do not limit myself to the precise construction shown and described, it being obvious that many changes might be made therein without departing from the spirit and scope of my invention.

Having thus described my invention what I claim and desire to secure by Letters Patent is:

1. An animal trap consisting of a rectangular receptacle provided with a horizontal partition dividing the same into upper and lower compartments and having a plurality of openings, said lower compartment having, at each side, a series of fixed, but resilient, converging, sheet metal prongs disposed edgewise in vertical series and adapted to form oval openings, means for holding bait at or near the center of said lower compartment, and a plurality of upwardly-opening, hinged trap doors closing said openings in said horizontal partition, and through which openings entrapped animals in the lower compartment may pass up into and then be confined in the said upper compartment of the trap.

2. An animal trap comprising a substantially square receptacle provided with a horizontal partition dividing the same into upper and lower compartments, said receptacle having an inlet opening at each side thereof leading into said lower compartment, a plurality of inwardly inclined prongs arranged in vertical series at either side of each of said openings, means for holding bait at substantially the center of said lower compartment, and an upwardly opening trap door in each corner of said partition.

In testimony whereof I affix my signature, in presence of two witnesses.

DECATUR D. DENNIS.

Witnesses:
G. O. BROWN,
C. M. CHAMBERS.